(12) United States Patent
Belghagi et al.

(10) Patent No.: US 9,371,779 B2
(45) Date of Patent: Jun. 21, 2016

(54) METHOD AND A DEVICE FOR ADJUSTING A SETPOINT VALUE OF A PARAMETER THAT INFLUENCES THRUST FROM A GAS TURBINE ENGINE

(71) Applicant: SNECMA, Paris (FR)

(72) Inventors: Hichem Belghagi, Garges-les-Gonesse (FR); Sylvain Clermonte, St Pierre du Perray (FR); Laurence Garin, Boissise la Bertrand (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/409,663

(22) PCT Filed: Jun. 11, 2013

(86) PCT No.: PCT/FR2013/051359
§ 371 (c)(1),
(2) Date: Dec. 19, 2014

(87) PCT Pub. No.: WO2013/190218
PCT Pub. Date: Dec. 27, 2013

(65) Prior Publication Data
US 2015/0285159 A1   Oct. 8, 2015

(30) Foreign Application Priority Data

Jun. 20, 2012   (FR) ..................... 12 01751

(51) Int. Cl.
*F02C 9/44* (2006.01)
*F02C 9/28* (2006.01)
(52) U.S. Cl.
CPC ... *F02C 9/44* (2013.01); *F02C 9/28* (2013.01); *F05D 2270/051* (2013.01);
(Continued)

(58) Field of Classification Search
CPC ........ F02C 9/28; F02C 9/44; F05D 2270/051; F05D 2270/3011; F05D 2070/303; F05D 2270/304; F05D 2270/312; F05D 2270/313; F05D 2270/708
USPC ............................................ 701/99, 100, 110
See application file for complete search history.

(56) References Cited

U.S. PATENT DOCUMENTS 4,136,517 A * 1/1979 Brown ..................... F02C 9/28
60/223
4,270,346 A * 6/1981 Dawson .................. F02C 9/32
60/243

(Continued)

FOREIGN PATENT DOCUMENTS

| EP | 0 198 751 | 10/1986 |
| FR | 2 890 939 | 3/2007 |

OTHER PUBLICATIONS

International Search Report Issued Jul. 25, 2013 in PCT/FR13/051359 Filed Jun. 11, 2013.

*Primary Examiner* — Thomas Tarcza
*Assistant Examiner* — Tyler J Lee
(74) *Attorney, Agent, or Firm* — Oblon, McClelland, Maier & Neustadt, L.L.P.

(57) ABSTRACT

A method of adjusting a setpoint value of at least one parameter that has an influence on thrust of a gas turbine engine propelling an aircraft during a stage of flight of the aircraft, the method including: obtaining a current value of at least one operating variable of the engine; extracting from a pre-established table a decrement value for the at least one parameter associated with the current value of the at least one operating variable of the engine; and adjusting the setpoint value of the at least one parameter by applying thereto the decrement value extracted from the table.

10 Claims, 3 Drawing Sheets

(52) U.S. Cl.
CPC .... *F05D 2270/303* (2013.01); *F05D 2270/304* (2013.01); *F05D 2270/3011* (2013.01); *F05D 2270/312* (2013.01); *F05D 2270/313* (2013.01); *F05D 2270/708* (2013.01)

(56) References Cited

U.S. PATENT DOCUMENTS

| | | | |
|---|---|---|---|
| 4,445,179 A * | 4/1984 | Michelotti | G05D 1/0005 244/182 |
| 4,686,825 A | 8/1987 | Cavasa et al. | |
| 5,211,007 A * | 5/1993 | Marvin | F02K 1/15 60/204 |
| 5,305,599 A * | 4/1994 | Marvin | F02K 1/15 60/226.3 |
| 5,315,819 A * | 5/1994 | Page | F02C 9/28 416/30 |
| 5,732,546 A * | 3/1998 | Pineo | F02C 9/28 60/39.281 |
| 6,209,821 B1 * | 4/2001 | Gary | B64D 33/02 137/15.2 |
| 6,389,816 B1 * | 5/2002 | McCarty | F02C 9/28 60/773 |
| 6,748,744 B2 * | 6/2004 | Peplow | F02C 9/28 60/243 |
| 7,194,392 B2 * | 3/2007 | Tuken | G05B 17/02 701/104 |
| 7,471,996 B2 * | 12/2008 | Bartel | F02C 9/00 244/53 B |
| 8,437,941 B2 * | 5/2013 | Chandler | F02C 9/28 290/52 |
| 8,977,413 B2 * | 3/2015 | Burns | G08G 5/0021 701/15 |
| 2003/0229427 A1 * | 12/2003 | Chapman | F02C 9/28 701/3 |
| 2004/0267414 A1 | 12/2004 | Bartel | |
| 2008/0249671 A1 | 10/2008 | Remy | |
| 2009/0222187 A1 | 9/2009 | Martling et al. | |
| 2013/0030611 A1 * | 1/2013 | Constans | G08G 5/025 701/7 |
| 2013/0238173 A1 * | 9/2013 | Burns | G08G 5/0065 701/15 |

\* cited by examiner

METHOD AND A DEVICE FOR ADJUSTING A SETPOINT VALUE OF A PARAMETER THAT INFLUENCES THRUST FROM A GAS TURBINE ENGINE

BACKGROUND OF THE INVENTION

The present invention relates to the general field of aviation.

It relates more particularly to regulating the thrust (i.e. the propulsive force) from a gas turbine engine of an aircraft during a stage of flight of the aircraft, such as a takeoff stage, for example.

The invention has a preferred application in a context in which it is proposed during a stage of flight of the aircraft to reduce the thrust from a gas turbine engine relative to a reference "limit" thrust normally used for this stage of flight (e.g. during the takeoff stage, relative to thrust that may be referred to as "full throttle post-combustion" thrust or FTPC thrust).

This reduction in thrust, also known as "thrust derating" presents several advantages.

Thus, in the first place, the noise produced by the engine during this stage of flight is reduced.

Furthermore, reducing thrust serves to limit stresses exerted on the components of the engine, in particular by lowering the temperature of the exhaust gas leaving the hot portions of the engine (after the combustion chamber): the reliability and the lifetime of these components is thus increased.

The fuel consumption of the engine is also decreased.

Thrust derating is a function commonly used in civil aviation during a takeoff stage for engines of the bypass turbojet (or turbofan) type. It leads to a reduction in the setpoints for the engine speed that is delivered to the turbojet by the full authority digital engine control (FADEC) device.

For a bypass turbojet, the thrust setpoint delivered by the engine regulator device during a stage of aircraft takeoff can be modeled as a function of outside temperature, in the manner shown in FIG. 1.

It is in the form of two curve portions P1 and P2 that are practically linear but with different slopes, which portions connect together at a discontinuity or break point CP. The abscissa value of the break point in FIG. 1 is the limit temperature T0.

In compliance with the relationship shown in FIG. 1, the thrust is regulated by the turbojet regulator device so that for a reported outside temperature higher than the limit temperature T0, the regulator system decreases the thrust setpoint (i.e. the speed of the turbojet) in order to limit the temperature of the outlet gas from the turbojet.

Given this behavior of the regulator device, a known mechanism for derating thrust consists in tricking the regulator device of the engine by informing it that the outside temperature is higher than its real value, and in particular higher than the limit temperature T0. As a result, the regulator device prepares a thrust setpoint for the engine on takeoff that is smaller than the "full throttle post-combustion" setpoint, in compliance with the regulation relationship modeled in FIG. 1.

The outside temperature for tricking the regulator device is also known as the "flex" temperature (or Tflex). It is supplied by the pilot to the regulator system and it is determined on the basis of tables that have been pre-established for various flight conditions (type of airplane, runway, airplane load, wind, etc.). The pilot activates (or deactivates) the changeover to operating the engine at reduced thrust merely by acting on a control lever of the airplane, in known manner (e.g. by positioning the lever in a determined position).

The drawback of that mechanism for derating thrust is that it is limited to gas turbine engines presenting a thrust regulation relationship as a function of outside temperature that is similar to the relationship shown in FIG. 1, i.e. that presents a break point beyond which the thrust setpoint prepared by the regulator system is reduced.

It so happens there exist gas turbine engines for which such a model is not appropriate (e.g. because there is no break point), and for which biasing the outside temperature does not suffice in order to be able to reduce thrust in controlled manner, i.e. with a known reduction factor. A particular example of such an engine is a gas turbine engine having an exhaust gas ejection nozzle of variable section.

There therefore exists a need for an alternative mechanism that enables the thrust of a gas turbine engine to be reduced relative to a reference limit thrust and that is capable of adapting to various types of gas turbine engine, which may have one or more degrees of freedom for regulating thrust (e.g. engine speed, nozzle section, reference limit thrust, etc.).

OBJECT AND SUMMARY OF THE INVENTION

The present invention satisfies this need in particular by proposing a method of adjusting a setpoint value of at least one parameter that has an influence on thrust of a gas turbine engine propelling an aircraft during a stage of flight of the aircraft, the method comprising:
  a step of obtaining a current value of at least one operating variable of the engine;
  a step of extracting from a pre-established table a decrement value for said at least one parameter associated with the current value of said at least one operating variable of the engine; and
  a step of adjusting the setpoint value of said at least one parameter by applying thereto the decrement value extracted from the table.

Correspondingly, the invention also provides a device for adjusting a setpoint value of at least one parameter that has an influence on thrust of a gas turbine engine propelling an aircraft during a stage of flight of the aircraft, the device comprising:
  means for obtaining a current value of at least one operating variable of the engine;
  means for extracting from a pre-established table a decrement value for said at least one parameter associated with the current value of said at least one operating variable of the engine; and
  means for adjusting the setpoint value of said at least one parameter by applying thereto the decrement value extracted from the table.

The invention thus proposes a simple solution for reducing the thrust of a gas turbine engine during a stage of flight, which solution is based on a pre-established table that, as a function of one or more operating variables of the engine, provides decrement values to be applied to the setpoint values delivered by the regulator device of the engine and relating to various degrees of freedom of the turbojet that have an influence on its thrust.

When the engine is a turbojet, these degrees of freedom or parameters that have an influence on its thrust may in particular be the following:
  a speed of rotation of a compressor of the turbojet;
  a surge margin of the compressor; and/or
  a richness of a combustion mixture of the turbojet.

Once as such a table has been established, the invention may thus be applied to various types of gas turbine engine that are characterized by one or more degrees of freedom.

The table may easily be established experimentally by performing tests and collecting data over a plurality of flights of the aircraft under similar conditions (e.g. same runway length, same airplane load, etc.), or by simulation on the basis of conventional mathematical models that reconstitute the thermodynamics of the engine and the regulation relationship applied to the engine.

The invention is thus not limited to one particular type of engine, but makes it possible to envisage reducing thrust for engines other than those conventionally used in civil aviation, while retaining the advantages that stem therefrom (i.e. reducing stresses on elements of the engine and increasing their reliability, reducing fuel consumption, and reducing noise generation).

The invention also makes it possible to reduce the thrust of the aircraft by adjusting a plurality of setpoint values simultaneously. It can thus be adapted to engines for which thrust depends not on a single parameter, such as outside temperature in particular, but on a plurality of parameters. For such engines, adjusting one or more setpoint values simultaneously may depend on a compromise between complexity and performance (or accuracy).

Furthermore, in accordance with the invention, in order to reduce thrust, use is advantageously made of current values of one or more operating variables of the engine (i.e. real values that are representative of the current states of the operating variables), as contrasted with fictitious values determined by the pilot of the aircraft. These current values may in particular be measurements delivered by sensors of the aircraft or they may be reconstituted from such measurements.

Thrust regulation in accordance with the invention is thus performed with greater accuracy than with the above-mentioned mechanism that is used in civil aviation.

It should be observed that the solution proposed by the invention may advantageously be incorporated entirely within the engine regulation device (FADEC).

Preferably, the operating variables used for determining the decrement values for the setpoint values are:
 a temperature at the inlet to the engine, such as the atmospheric temperature or ambient temperature; and/or
 an atmospheric pressure at the inlet to the engine.

The regulation relationship of engines depend more particularly on these operating variables, and specifically on atmospheric temperature at the inlet to the engine.

The current values of these variables can be obtained by measurements performed by sensors of the aircraft.

These examples of operating variables used for determining the decrement values to be applied to the setpoint values having an influence on thrust and as delivered by the regulation device are not themselves limiting. In a variant, it is possible to envisage other operating variables in the ambit of the invention, such as for example an internal temperature of the engine, or the outlet temperature of its exhaust gas, etc.

Furthermore, it is also possible to envisage that the decrement value(s) extracted from the table for each parameter also depend(s) on a current speed and/or a current load of the aircraft.

When the stage of flight is a stage of the aircraft taking off, the decrement value extracted from the table for each parameter may also depend on the length of runway used by the aircraft during the takeoff stage.

These various factors make it possible to further improve the accuracy of derating, since the way the setpoint value(s) is/are adjusted is adapted to the flight conditions of the aircraft.

Thus, by way of example, when the decrement value depends on runway length, the invention makes it possible to adapt the thrust of the engine all along takeoff.

In a particular implementation of the invention, during the adjustment step, the setpoint value of the speed of rotation of the compressor and the setpoint value of the surge margin are adjusted.

This implementation is particularly advantageous when it is intended to derate the thrust from a bypass turbojet with a variable nozzle. Such an engine is used in particular in military aviation. By way of example such an engine is the M88 engine developed by Snecma.

For such an engine, thrust depends both on the speed of rotation of the low pressure compressor of the turbojet and on the surge margin of the compressor. These two factors are influenced respectively by the rate at which fuel is injected into the combustion chamber of the engine and by the section of the nozzle.

In another implementation, during the adjustment step, the value of the decrement applied to the setpoint value is weighted by a weighting factor of less than 1.

This weighting factor may depend in particular on the state of advance of the flight stage.

It is thus possible to apply a degressive decrement value to the setpoint values as a function of the state of advance of the flight stage. This makes it possible to reduce progressively the impact of the adjustment performed on the setpoint values when the stage of flight during which the adjustment is being performed comes to an end. This progressive reduction is more ergonomic for the pilot of the aircraft and seeks in particular to avoid any sudden return to maximum thrust, which the pilot might find disagreeable or surprising.

The weighting of the decrement value also makes it possible to deactivate the adjustment of the setpoint values almost instantaneously (by applying a zero weighting factor) so that the engine can deliver its maximum thrust. Such deactivation of the adjustment may, for example, result from detecting a particular event such as a request from the pilot of the aircraft.

In a particular implementation, the various steps of the adjustment method are determined by computer program instructions.

Consequently, the invention also provides a computer program on a data medium, the program being suitable for being performed in an adjustment device, or more generally in a computer, the program including instructions adapted to performing steps of an adjustment method as described above.

The program may use any programming language, and be in the form of source code, object code, or code intermediate between source code and object code, such as in a partially compiled form, or in any other desirable form.

The invention also provides a computer-readable data medium including instructions of a computer program as mentioned above.

The data medium may be any entity or device capable of storing the program. For example, the medium may comprise storage means such as a read only memory (ROM), e.g. a compact disk (CD) ROM or a microelectronic circuit ROM, or indeed magnetic recording means, e.g. a floppy disk or a hard disk.

Furthermore, the data medium may be a transmissible medium such as an electrical or optical signal, which may be conveyed via an electrical or optical cable, by radio, or by other means. The program of the invention may in particular be downloaded from an Internet type network.

Alternatively, the data medium may be an integrated circuit in which the program is incorporated, the circuit being adapted to execute or to be used in the execution of the method in question.

For regulating the thrust of a gas turbine engine propelling an aircraft during a stage of flight, the invention also provides the use of a setpoint value for at least one parameter that influences said thrust and that has been adjusted with the help of a method of the invention.

BRIEF DESCRIPTION OF THE DRAWINGS

Other characteristics and advantages of the present invention appear from the following description made with reference to the accompanying drawings which show an implementation having no limiting character. In the figures.

DETAILED DESCRIPTION OF THE INVENTION

Figure 1:
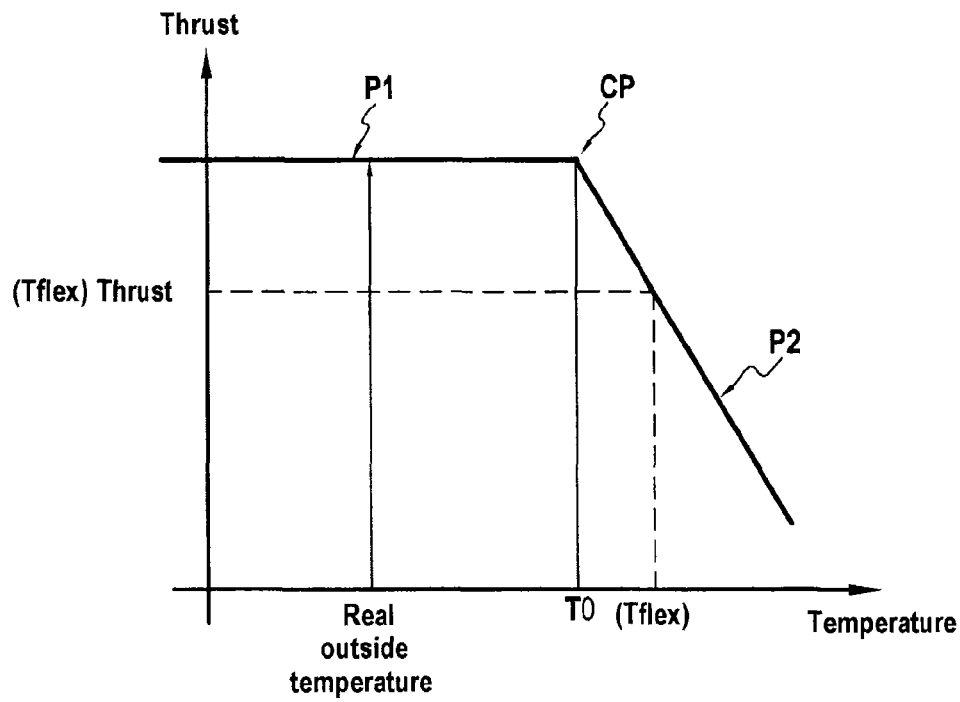
FIG. 1, described above, shows how the thrust from a civil aviation turbojet is varied as a function of outside temperature.
Figure 2:
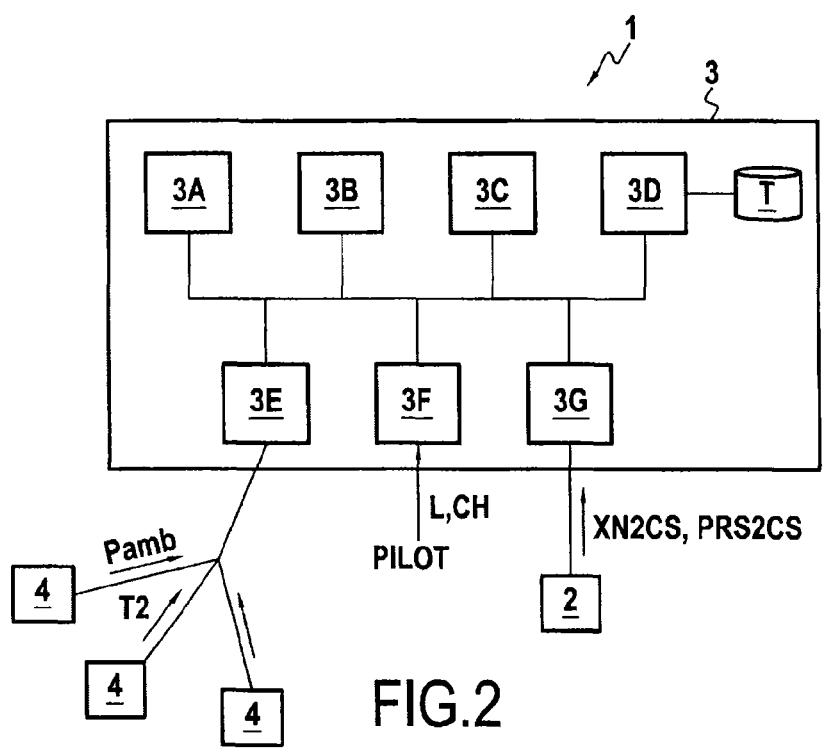
FIG. 2 shows a system for regulating the thrust from a turbojet, which system comprises an adjustment device in accordance with the invention, in a particular embodiment.

FIG. 2 is a block diagram of a system 1 for regulating the thrust of a gas turbine engine propelling an aircraft.

In the example described, the gas turbine engine in which thrust is to be regulated is a two-spool turbojet having two gas streams that are mixed together, having an exhaust gas ejection nozzle of variable section and propelling an airplane. By way of example, it may be an M88 engine developed by Snecma.

Naturally, the invention applies to any other type of aircraft gas turbine engine.

During a stage of the aircraft taking off, attention is given more particularly to reducing (i.e. derating) the thrust of the turbojet relative to a reference maximum thrust referred to as "full throttle post-combustion" thrust or FTPC thrust.

This assumption relating to the stage of flight is nevertheless not limiting, and the invention may also be applied to regulating and reducing the thrust from the turbine engine during other stages of flight of the aircraft, such as in particular during a cruising stage.

It should be observed that it is possible to make use of mechanisms for automatically detecting the current stage of flight of the aircraft so as to activate thrust derating only during predetermined stages (e.g. only during a takeoff stage). Such mechanisms are themselves known and are not described in greater detail herein.

In a variant, thrust derating in accordance with the invention may be activated (or deactivated) on detecting a specific command from the pilot (e.g. placing a control lever of the aircraft in a predetermined position).

The system 1 for regulating the thrust of the turbojet in this example incorporates the full authority digital engine control (FADEC) device 2 and a device 3 for adjusting a setpoint value of at least one parameter that has an influence on the thrust of the turbojet, in accordance with the invention in a particular embodiment.

In a variant embodiment, the adjustment device 3 of the invention is incorporated in the FADEC 2.

In known manner, the thrust from a two-spool bypass turbojet having a variable section nozzle can be regulated by acting on two parameters in particular, namely:
  the speed of rotation of the low pressure compressor of the turbojet, which has an impact on the speed of the turbojet, and which depends on the flow rate of fuel in the main combustion chamber of the turbojet; and
  the surge margin of the compressor, which depends directly on the section of the turbojet nozzle.

These parameters constitute parameters that have an influence on the thrust of the turbojet in the meaning of the invention.

In known manner, the thrust from the turbojet at maximum "full throttle post-combustion" speed is regulated by the FADEC 2: it acts at various instants t to deliver setpoint values relating to the above-mentioned parameters to various regulator loops of the turbojet, which parameters in this example are written respectively XN2CS(t) and PRS2CS(t). In the description below, these setpoint values are prepared by the FADEC on the basis of predetermined regulation relationship that are themselves known. The setpoint values prepared by the FADEC for regulating the thrust of the turbojet at maximum speed are said to be "nominal".

The invention proposes derating the thrust from the turbojet during a stage of the aircraft taking off by adjusting the "full throttle post-combustion" setpoint values XN2CS(t) and PRS2CS(t) as delivered at instant t by the FADEC 2, with the help of decrement values that are written $\Delta XN2(t)$ and $\Delta PRS2(t)$ and that are determined by the adjustment device 3. In order to simplify the notation, in the description below, the reference to the time dependency (instant t) may be omitted from the variables XN2CS(t), PRS2CS(t), $\Delta XN2(t)$, and $\Delta PRS2(t)$.

The decrement values $\Delta XN2$ and $\Delta PRS2$ are advantageously determined in accordance with the invention on the basis of current values of operating variables of the turbojet (i.e. on the basis of real values that represent the current states of these operating variables).

In the presently-described implementation, the following operating variables are used: the inlet temperature to the turbojet, written T2, and the ambient atmospheric pressure around the turbojet, written Pamb. The current values of these operating variables are measured using temperature and pressure sensors 4 that are themselves known and that are already present in the aircraft.

Furthermore, in the presently-described implementation, the decrement values determined by the adjustment device 3 also depend on factors other than the operating variables T2 and Pamb, namely:
  the current speed of the aircraft, written CurMACH, as reconstituted from measurements performed in particular by position sensors 4 of the aircraft using principles well known to the person skilled in the art; and
  information delivered by the pilot of the aircraft relating in particular to:
    the available length (written L) of the runway to be used by the aircraft during the takeoff stage; and
    the load configuration (written CH) of the aircraft (e.g. its empty weight, payload weight, etc.).

In this example, the adjustment device 3 presents the hardware architecture of a computer.

In particular, it comprises a processor 3A, a random access memory (RAM) 3B, a ROM 3C, and a non-volatile flash memory 3D.

The adjustment device 3 also has communication means 3E for communicating with the sensors 4 of the aircraft (temperature sensor, pressure sensor, position sensor, etc.), interface means 3F for communicating with the pilot of the aircraft and serving in particular to enable the pilot to provide information concerning the available length of runway and the load of the aircraft, and communication means 3G for communicating with the FADEC 2. By way of example, the communication means 3E and 3G incorporate a conventional digital data bus enabling the various electronic entities to communicate with one another.

The information supplied to the pilot via the interface 3F is stored in the non-volatile flash memory 3D.

The ROM 3C constitutes a data medium in accordance with the invention that is readable by the processor 3A and that stores a computer program in accordance with the invention including instructions for executing steps of an adjustment method of the invention as described below with reference to FIGS. 3 and 4.

Figure 3:
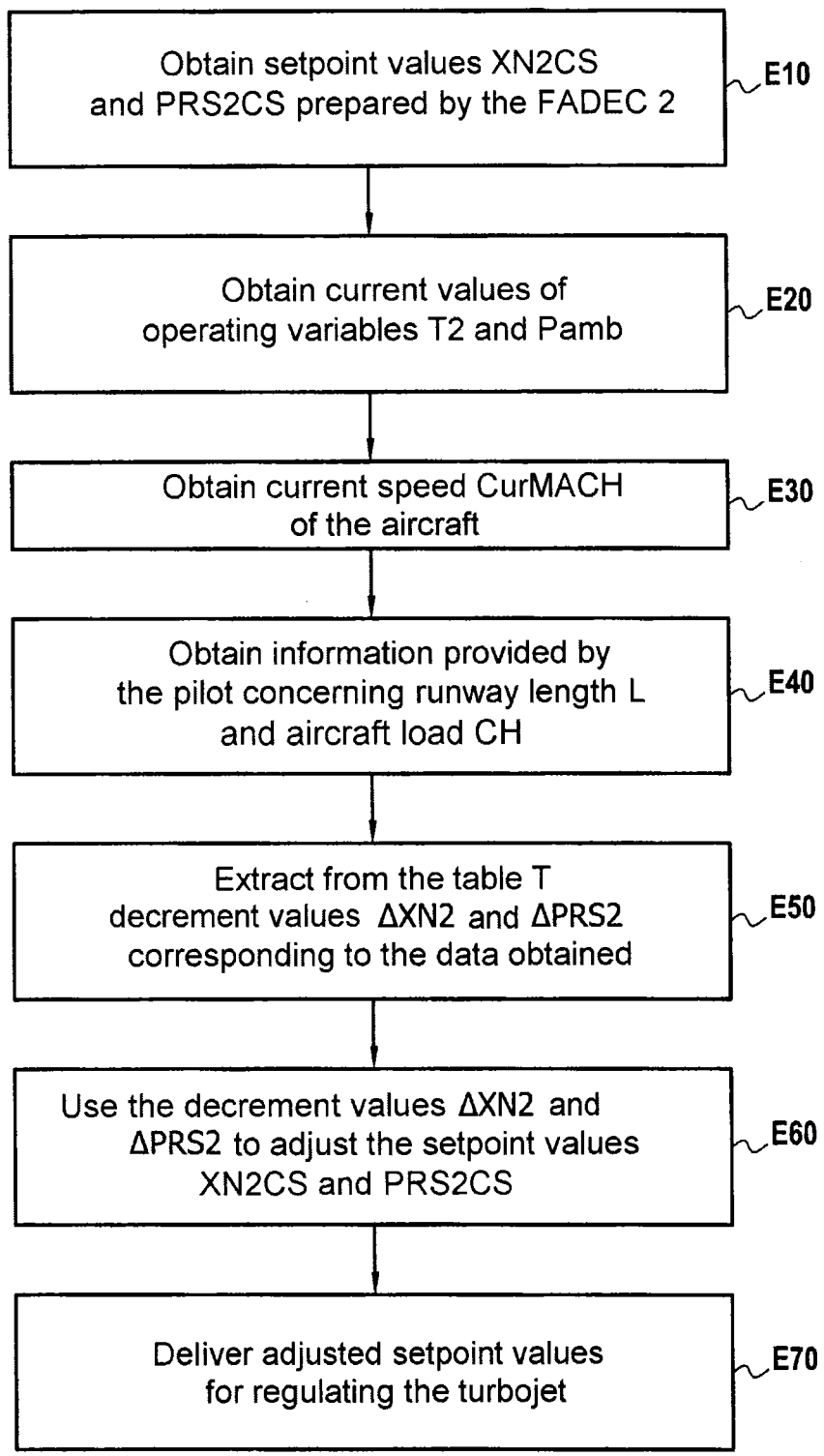
FIG. 3 is a flow chart showing the main steps of an adjustment method in accordance with the invention as performed by the FIG. 2 adjustment device.

FIG. 3 shows the main steps performed by the adjustment device 3 during the takeoff stage of the aircraft in order to adjust the nominal setpoint values XN2CS(t) and PRS2CS(t) as delivered at instant t by the FADEC 2 for the purpose of reducing the thrust of the turbojet relative to the FTPC speed.

It is assumed herein that the setpoint values XN2CS and PRS2CS evaluated by the FADEC 2 are transmitted to the adjustment device 3 via the communication means 3F (step E10).

In order to adjust these values, the adjustment device 3 aggregates various types of data.

Thus, via its communication means 3E, it obtains the current values of the temperature T2 at the inlet to the turbojet and of the ambient atmospheric pressure Pamb as measured by the sensors 4 (step E20).

The adjustment device 3 also obtains measurements from the sensors 4 that enable it to reconstitute the current speed CurMACH of the aircraft (step E30).

Finally, it also consults its non-volatile memory 3D to obtain additional information provided by the pilot relating in particular to the length L of runway available for aircraft takeoff and to the takeoff load CH of the aircraft (step E40).

It should be observed that the steps E20, E30, and E40 may be implemented equally well simultaneously or on the contrary in succession.

The adjustment device 3 then uses the data as aggregated in this way to determine decrement values for applying to the nominal setpoint values XN2CS and PRS2CS as delivered by the FADEC 2.

More precisely, using this data, the device 3 consults a pre-established table T that is stored in its non-volatile flash memory 3D, and it extracts from this table decrement values for the speed of rotation of the low pressure compressor of the turbojet and for the surge margin of the compressor, which values are associated with said data.

The term "table" is used herein to cover any type of database or data structure having two or more dimensions enabling data to be stored and cross-referenced.

In the presently-described implementation, a table T is pre-established for each stage of flight (e.g. one table for a takeoff stage, another table for a cruising stage). The table T is pre-established for a particular type of engine, and in this example for an engine of the same type as the turbojet that is to have its thrust regulated. Thus, if the turbojet that is to have its thrust regulated is an M88 engine as developed by Snecma, then a table T is used that has been pre-established for an M88 type engine.

In a variant, it is possible to envisage establishing a table that depends individually on the particular turbojet that is to have its thrust regulated.

Figure 4:
FIG. 4 shows an example of a table suitable for use in adjusting setpoint values in accordance with the invention.

An example of such a table T is shown in FIG. 4 for the takeoff stage.

In the presently-described implementation, the table T associates various operating data values aggregated by the adjustment device 3 (in other words various values for the operating variables T2 and Pamb, and for the speed of the aircraft, and also various aircraft load configurations and takeoff runway lengths) with an array of corresponding decrement values to be applied to the nominal setpoint values XN2CS(t) and PRS2CS(t) in order to limit the thrust of the turbojet.

These decrement values are selected so as to ensure that the turbojet develops sufficient thrust at all times to enable the aircraft to take off while using the available runway length L, while nevertheless not making use of the full thrust potential of the turbojet. This logic for establishing the table T thus provides saving in terms of sound, and also in terms of fuel consumption and potential lifetime in comparison with taking off at FTPC maximum speed.

The decrement values listed in the table T may be established during a preliminary step, e.g. on the basis of the results of simulations performed using conventional mathematical digital models serving to reconstitute the thermodynamics of the turbojet and taking account of the regulation relationship supplied by the FADEC 2. These models are specific to each turbojet and are conventionally provided by engine manufacturers.

Thus, by way of illustration, for an aircraft of the Rafale type propelled by an M88 engine as developed by Snecma, it is possible during this preliminary step to begin by using a model for a Rafale type airplane to calculate the minimum thrust needed at each instant to enable the aircraft to take off using the entire available runway length made available to the aircraft (e.g. 2700 meters (m) on runway A). This minimum thrust depends on atmospheric conditions (atmospheric temperature and pressure), on the length of the runway, and on the load and the speed of the aircraft.

Thereafter, using a model for the M88 engine, the setpoint values for the low pressure compressor speed and for the surge margin corresponding to this minimum thrust are determined. This model also serves to obtain the nominal setpoint values for the low pressure compressor speed and for the surge margin corresponding to the turbojet being regulated for FTPC maximum speed.

Thereafter, decrement values for entering into the table T are deduced from these nominal setpoint values and setpoints.

In a variant, the values in the table T may be established experimentally, by means of tests performed on the turbojet.

The adjustment device 3 thus extracts from the table T the decrement values $\Delta XN2$ and $\Delta PRS2$ for the setpoints for the speed of rotation of the low pressure compressors of the turbojet and for the surge margin of the compressor in association with the data aggregated during steps E20, E30, and E40.

It should be observed that when the data obtained during steps E20, E30, and E40 does not correspond exactly to the values provided in the table T, the adjustment device 3 extracts from the table T decrement values that correspond to the values provided in the table that are the closest on either side of the values obtained during the steps E20, E30, and E40, and then performs numerical interpolation (e.g. linear interpolation) between the decrement values as extracted in this way. The adjustment device 3 thus obtains decrement values corresponding to the data obtained in steps E20, E30, and E40.

By way of illustration, two examples are given with reference to the table shown in FIG. 4:

EXAMPLE 1

It is assumed that:

T2 and Pamb are representative of a temperature and a pressure that are equal to the temperature and the pressure given by the standard atmosphere model (specifically the international standard atmosphere (ISA)), given the current altitude of the aircraft. In other words, T2 and Pamb are representative of atmospheric conditions referenced "ISA" in table T in FIG. 4.

The configuration of the aircraft is representative of a "light" configuration.

The available runway length is 2700 m.

The current speed of the airplane CurMACH is estimated at 0.3 Mach.

In this example, the adjustment device 3 extracts from the table T the following decrement values:

$$\Delta XN2 = -x2 \text{ revolutions per minute (rpm)}$$

and $$\Delta PRS2 = +y2\%$$

EXAMPLE 2

It is assumed that:

T2 and Pamb are representative of atmospheric conditions equal to ISA+15.

The configuration of the aircraft is representative of a "light" configuration.

The available runway length is 2700 m.

The current speed of the airplane CurMACH is estimated at 0.2 Mach.

In this second example, the adjustment device 3 extracts from the table T:

two decrement values for the speed of rotation of the low pressure compressor, namely −x3 rpm and −x4 rpm; and
two decrement values for the surge margin of the low pressure compressor, namely +y3% and +y4%.

Thereafter, it deduces the decrement values ΔXN2 and ΔPRS2 that are to be applied to the setpoint values on the basis of interpolation performed for ΔXN2 between −x3 and −x4, and for ΔPRS2 between +y3 and +y4. The adjustment device 3 then applies the decrement values ΔXN2 and ΔPRS2 as extracted in this way from the table T to the setpoint values XN2CS and PRS2CS as provided by the FADEC 2 (step E60).

More particularly, in the presently-described implementation, it adjusts the setpoint values as follows:

$$XN2CS(\text{adjusted}) = XN2CS + \gamma \times \Delta XN2$$

$$PRS2CS(\text{adjusted}) = PRS2CS + \gamma' \times \Delta PRS2$$

where $\gamma$ and $\gamma'$ designate weighting factors that are less than or equal to 1.

The weighting factors $\gamma$ and $\gamma'$ may be identical or they may be different.

Furthermore, these weighting factors may vary as a function of time, e.g. depending on the state of advance of the flight stage. It is thus possible to deactivate the thrust derating in progressive manner so that at the end of the takeoff stage, the setpoint values delivered by the FADEC 2 are no longer adjusted.

In a variant implementation, if the adjustment device 3 detects a pilot command seeking to benefit from FTPC maximum thrust or some other type of predetermined event (e.g. a particular position of an aircraft control lever) indicating that nominal thrust is required (i.e. thrust corresponding to the setpoint delivered by the FADEC 2 prior to adjustment), then the weighting factors $\gamma$ and $\gamma'$ are set to zero so as to deactivate derating.

The adjustment device 3 then delivers the adjusted setpoint values XN2CS(adjusted) and PRS2CS(adjusted) to the regulation loops of the turbojet (step E70).

The regulation of the turbojet is then performed on the basis of the setpoint values as adjusted in this way so that the thrust from the turbojet is indeed reduced compared with its FTPC maximum thrust.

In the presently-described implementation, the thrust from the two-spool bypass turbojet is derated by adjusting both the value of the setpoint relating to the speed of rotation of the low pressure compressor of the turbojet, and the setpoint value relating to the surge margin of the compressor.

In a sub-optimal variant implementation, it is possible to envisage adjusting only one of these two values.

In yet another variant, it is possible to envisage adjusting other parameters that have an influence on the thrust from the turbojet (in addition to the two parameters mentioned above or taking the place of one or both of those two parameters), such as for example the richness of a combustion mixture of the turbojet. The table T is then adapted to reflect the decrement values that enable this combustion mixture richness to be adjusted as a function of the data aggregated in steps E20, E30, and E40.

Furthermore, in the presently-described implementation, it is envisaged that the thrust of the turbojet is to be reduced relative to a "full throttle post-combustion" maximum thrust. In a variant, it is possible to envisage reducing the thrust from the turbojet relative to some other reference thrust, itself less than the FTPC thrust, such as for example relative to an intermediate post-combustion thrust, a dry full throttle thrust, or indeed a dry intermediate thrust, which are themselves known.

The invention claimed is:

1. A method of adjusting a setpoint value of at least one parameter that has an influence on thrust of a gas turbine engine propelling an aircraft during a stage of flight of the aircraft, the method comprising:
    obtaining a current value of at least one operating variable of the engine;
    extracting from a pre-established table a decrement value for the at least one parameter associated with the current value of the at least one operating variable of the engine; and
    adjusting the setpoint value of the at least one parameter by applying thereto the decrement value extracted from the table.

2. A method according to claim 1, wherein the at least one operating variable of the engine is selected from:
    a temperature at an inlet to the engine; and
    an atmospheric pressure at the inlet to the engine.

3. A method according to claim 1, wherein the engine is a turbojet and the at least one parameter is selected from:
    a speed of rotation of a compressor of the turbojet;
    a surge margin of the compressor; and
    a richness of a combustion mixture of the turbojet.

4. A method according to claim 3, wherein, during the adjustment, the setpoint value of the speed of rotation of the compressor and the setpoint value of the surge margin are adjusted.

5. A method according to claim 1, wherein the decrement value extracted from the table for each parameter also depends on a current speed and/or a load of the aircraft.

6. A method according to claim 1, wherein the stage of flight is a stage of the aircraft taking off and the decrement value extracted from the table for each parameter also depends on a length of a runway used by the aircraft during the takeoff stage.

7. A method according to claim 1, wherein during the adjustment, the value of the decrement applied to the setpoint value is weighted by a weighting factor of less than 1.

8. A method according to claim 7, wherein the weighting factor depends on a state of advance of the flight stage.

9. A non-transitory computer readable medium including a computer program including instructions for executing the method according to claim 1 when the program is executed by a computer.

10. Use, for regulating a thrust of a gas turbine engine propelling an aircraft during a stage of flight, of a setpoint value for at least one parameter that influences the thrust that has been adjusted according to the method of claim 1.

* * * * *